Oct. 10, 1967     J. L. WHITE ET AL     3,346,681
METHOD OF MAKING REFRACTORY PRODUCTS
Filed June 23, 1965
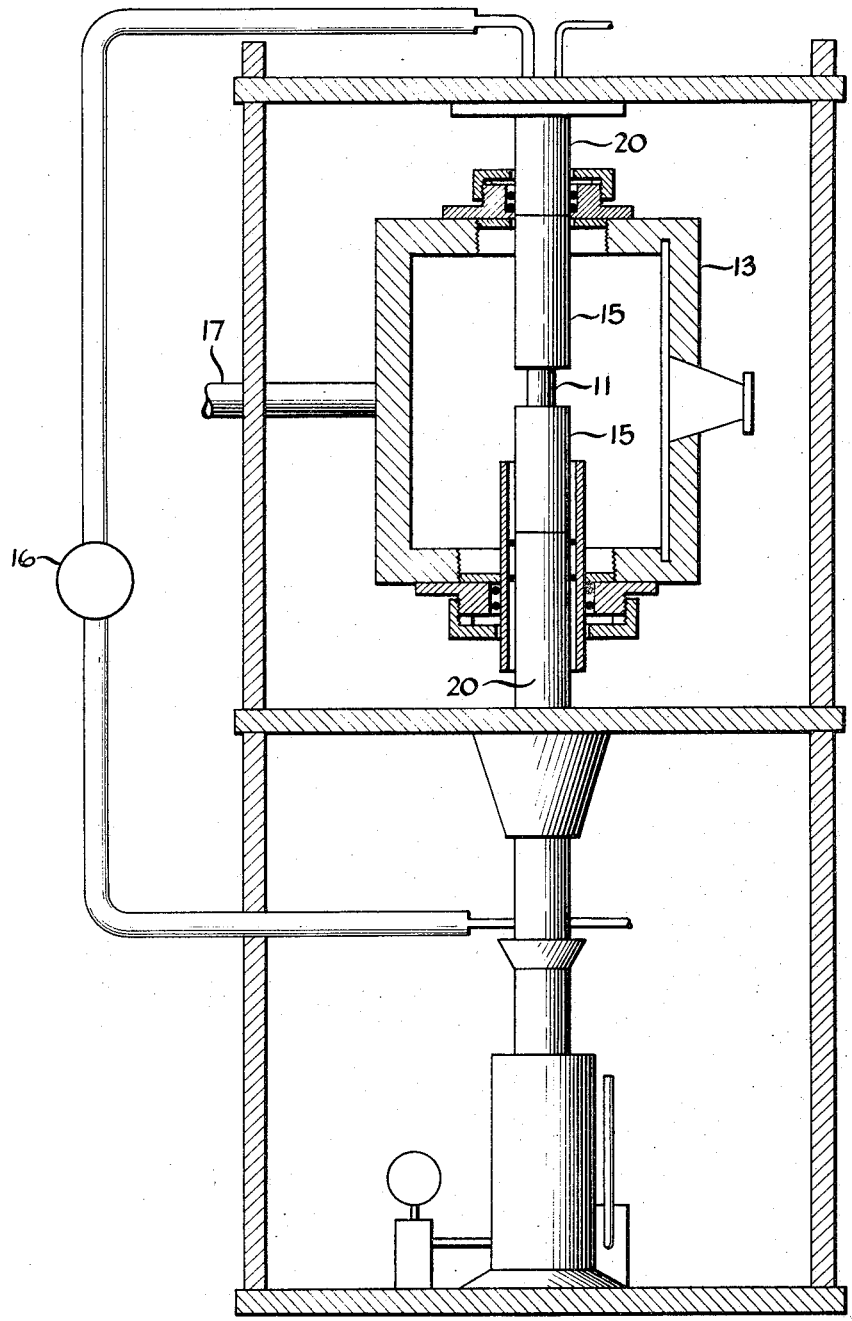
INVENTORS
JACK L. WHITE
JOSEPH M. PONTELANDOLFO
BY
ATTORNEY 3,346,681
    METHOD OF MAKING REFRACTORY
              PRODUCTS
Jack L. White, Del Mar, and Joseph M. Pontelandolfo,
 San Diego, Calif., assignors, by mesne assignments, to
 the United States of America as represented by the
 United States Atomic Energy Commission
        Filed June 23, 1965, Ser. No. 466,490
              7 Claims. (Cl. 264—56)

ABSTRACT OF THE DISCLOSURE

A method for treating a body formed of a refractory material matrix which includes a liquable dispersant, which method comprises heating the body to a temperature sufficient to maintain dispersant in a liquid state while applying a compressive stress to said body for a predetermined time while said dispersant is molten.

---

The present invention relates to refractory material and more particularly relates to methods for making high temperature refractory products having improved physical and structural properties and to the products which result from these methods.

Improvements in refractory materials are continually being sought to provide products that are useful at high operating temperatures and for prolonged periods of time. Desirable features of such products include higher density and decreased pore size which results in higher structural strength and low permeability to gas flow. Refractory material, for purposes of this application, is defined as a substance which exhibits good structural strength at temperatures above about 1000° C. Moreover, the refractory materials with which this application is concerned should be capable of formation into a structural body from particulate form without necessarily undergoing chemical changes. Thus, the definition embraces special refractories, such as carbon or graphite, as well as ceramic and powdered metal materials. It is also desirable to control the degree of crystal orientation in a structural body, thus gaining control of such directional properties as thermal expansion, thermal conductivity and irradiation-induced dimensional effects. Nuclear reactors provide one application wherein such refractory products are especially useful.

Methods for making refractory products having improved physical properties, such as high structural strength, density, low gas permeability, and controlled crystal orientation are desired.

It is the principal object of the present invention to provide methods for making improved refractory products. It is another object of the invention to provide high temperature refractory products which have high structural strength, density, durability, and hardness, and low permeability to gases and to provide methods for making such products. It is a further object of the invention to provide a method for making high temperature refractory products having controlled crystal orientation which is simple and economical. Further objects and advantages of the present invention will be apparent from a study of the following detailed descriptions of processes embodying various features of the invention and of the drawing wherein one such process is diagrammatically illustrated.

Generally, the present invention involves forming a structural body comprising a matrix of refractory material, and a suitable liquable dispersant. The structural body is heated to a temperature sufficient to melt the liquable dispersant, and the body is hot-worked, using a compressive stress. The compressive stress is applied to the body in one direction leaving the body free to expand in a direction generally perpendicular to this one direction. Hot-working is continued for a time sufficient to induce a desired permanent strain in the body.

The liquable dispersant may be any suitable material that melts or reacts with a portion of the refractory matrix to form a liquid phase at a temperture below the vaporization or melting temperature of the refractory matrix material. Preferably, no detrimental chemical reaction should occur between the matrix material and the dispersant. It is desirable for the liquable dispersant to be present in sufficient quantity and uniformly distributed so that the entire matrix material is permeated by this liquid dispersant. The excess liquid phase is squeezed from the interior of the body during the hot-working step.

During the hot-working step, inherent orientation texture of crystals of the matrix material may be altered through the deformation of the crystal during hot-working. The degree of orientation is dependent on the inherent orientation texture of the starting material and on the extent to which the body is hot-worked, that is, to the total amount of strain that is induced.

Now considering more particularly the steps of a method illustrative of the present invention, refractory material in powdered form of suitable mesh size is uniformly mixed with a suitable amount of a liquable dispersant to provide a charge from which a structural body may be formed.

For illustrative purposes, the invention is hereinafter described using carbon as the refractory material. For purposes of this application, the term carbon should be considered to include both amorphous carbon and graphite. It should be understood however that other refractory materials, such as beryllia, alumina, zirconia, titania, and the like, or mixtures of such materials, may also be used in the methods of this invention.

When particulate carbon is used as the refractory material, the particle size should be between about 5 microns and about 100 microns and preferably between about 10 microns and about 50 microns. Particles of larger size may produce products with relatively low densities and lesser structural strength, even after hot-working. Smaller particle sizes are considered unnecessary and may increase the cost of the product.

Because it is desirable to have the liquable dispersant uniformly distributed in the interstices in the carbon particle matrix, the average particle size of dispersant particles is preferably smaller than the carbon particles. Suitable liquable dispersants for use in a carbon matrix include carbides of zirconium, molybdenum, uranium, niobium, thorium, titanium, tantalum, vanadium, tungsten, aluminum, and the above metals and compounds thereof which form a carbide on thermal treatment. Preferably zirconium or molybdenum carbide is employed. If a refractory material other than carbon is used, a suitable liquable dispersant is chosen.

The amount of dispersant used should be sufficient to aid in achieving a plastic flow condition for the carbon particles at the temperature of hot-working. Moreover, if a greater amount than a certain calculable maximum is employed, it will result in squeezing molten dispersant from the surface of the body. Hence, the final maximum concentration in the resultant product is somewhat self-limiting. The particular amount of dispersant employed is dependent on the particular refractory material and dispersant used. As an example, when zirconium carbide is used as the dispersant in a carbon matrix, initial mixture concentrations are employed of from about 10 weight percent to 50 weight percent ZrC, based upon the total weight of the body prior to hot-working, and preferably at least about 25 weight percent ZrC is used. In general, when other dispersants are used with carbon refractory material, equivalent volumes of dispersant are used.

Mixing of the particulate refractory material with the liquable dispersant may be carried out in any suitable manner to insure uniform distribution. Preferably, a suitable binder is employed to facilitate subsequent forming. After mixing, the prepared charge is formed into a structural body of suitable shape by any suitable forming process, such as hot-pressing or extrusion. The body may then be heated in an inert atmosphere to drive off any volatiles and/or carbonize any organic materials used as binders. As an example, hot-pressing at about 800° C. for about one hour is often employed.

The structural body is then placed in a furnace capable of heating the body to a temperature above the melting point of the liquable dispersant. This temperature is hereafter referred to as the hot-working temperature. The furnace is equipped with means, such as a pair of opposed pistons, capable of exerting compressive stress on opposite faces of the structural body at the hot-working temperature. The pistons may be fabricated of any suitable material that is resistant to deformation at the hot-working temperature, such as graphite, and of cross-section greater than that of the structural body being deformed. The body may usually be placed into the furnace while it is cold and heated to the hot-working temperature at a rate dependent merely on the heating capacity of the furnace. Of course, heating should not be so rapid as to crack the structural body.

When the body has reached the hot-working temperature, sufficient compressive stress is applied to opposite faces of the body for a time sufficient to induce a permanent strain of a desired degree in the body. In the furnace, the body is free to expand in a direction generally perpendicular to the direction of movement of the pistons as a result of the induced strain. The degree of strain imposed is dependent upon the final properties desired in the product, as hereafter explained. For purposes of this application, it is noted that any strain figures referred to are in terms of true strain, which is defined as the integral of $dL/L$, L being the length of the structural body between the two faces to which stress is applied.

It should be readily understood that the variables of hot-working temperature, compressive stress, time during which stress is applied, and degree of strain are highly inter-dependent. Thus, a hot-working temperature that is at or only slightly above the eutectic temperature of the liquable dispersant requires a higher compressive stress or a longer time to achieve a given degree of strain than would be required if a higher hot-working temperature is used. Similarly, to achieve a given strain at a given hot-working temperature either a high stress for a short time or a low stress for a longer time may be used.

Generally, it is considered desirable to use as high a temperature as possible without causing melting or volatilization of the refractory matrix material and as high a compressive stress as possible. The upper stress limit is depedent on the refractory material used and is determined by the amount of stress that causes fracture of the structural body. Generally, compressive stresses from about 2000 p.s.i. to about 10,000 p.s.i. are used with carbon matrix material, although stresses outside this range may be used commensurate with the considerations previously set forth. Use of high hot-working temperatures and high compressive stresses results in shorter times for achieving a given degree of strain, thus reducing the ultimate cost of processing.

The pore diameter of such hot-worked products and the related attributes of gas permeability, density, structural strength and hardness are believed to be directly related to the degree of strain induced in the body. Strain levels of as low as about 15 percent are observed to noticeably improve these properties. Strain levels of as high as 65 percent have been attained, but the degree of improvement with increasing strain decreases at the higher strain levels and a strain level of about 60 percent is considered to be a practical upper limit for reasons of economy.

In addition to the above mentioned improvements, it also has been found that controlled preferred crystal orientation can be introduced in a structural body through hot-working. For example, in the case of hot-working graphite bodies containing a dispersed liquid carbide, the graphite crystals are realigned so that the graphite layer planes (i.e., the $a$-direction of the hexagonal crystal lattice of graphite) tend to be perpendicular to the direction in which the hot-working stress is applied. The degree of realignment is dependent on the amount of hot-working i.e., to the percent strain induced in the body.

Extrusion forming processes tend to align the layer planes of graphite parallel to the direction of extrusion, that is, to induce a substantial crystalline orientation in the direction of extrusion. Thus, when extrusion is used as a forming process for a refractory material, the physical properties dependent on crystal orientation, such as thermal expansion or heat conduction, are strongly anisotropic. Individual molding operations, such as hot pressing, also tend to induce an inherent orientation. This inherent orientation, and the resulting anisotropy, may be undesirable for certain applications, such as nuclear reactor fuel elements, where it is desirable to have thermal expansion and efficient heat transfer in a direction other than the direction of inherent crystal orientation induced through the forming process.

By applying the above-described hot-working process, it is possible to prepare refractory products having a controlled degree of crystal orientation, and thus a controlled degree of anisotropy, including the special case of an isotropic product. For example, this may be accomplished by applying a compressive stress to an extruded rod at hot-working temperatures in a direction parallel to the axis of extrusion. This stress tends to convert the inherent crystal orientation from extrusion (graphite layer planes parallel to the axis of extrusion) to an orientation wherein the graphite layer planes are perpendicular to the direction of hot-working and thus substantially increased heat transfer in a direction radially of the rod. By halting the hot-working process at an appropriate point, generally determined by experiment for a particular type of extruded body, it is possible to prepare a refractory product having a controlled degree of crystal orientation. It is likewise possible to induce a greater or lesser degree of anisotropy in molded bodies by hot-working in directions parallel or perpendicular to the axis of forming.

In general, the conditions set forth hereinbefore for inducing strain in structural bodies of a refractory material matrix containing a liquable dispersant will provide the above-described crystal orientation. In structural carbon bodies, hot-working at a temperature of at least about 2500° C. to induce a true strain of at least about 20 percent is considered to provide substantial crystal orientation in a direction generally perpendicular to the direction in which the stress is applied. Thus, by applying the above-described hot-working method to a cylindrical body which was extruded from a mixture of graphite and zirconium carbide, the physical properties of the body are simultaneously improved as a result of two mechanisms. The plastic flow which occurs in the molten dispersant-containing graphite body increases density, structural strength and hardness and decreases porosity while the crystal reorientation increases thermal conductivity in a radial direction, reduces thermal conductivity in the longitudinal direction, decreases thermal expansion in a radial direction, and increases thermal expansion in the longitudinal directional.

The following examples further illustrate certain features of the invention.

EXAMPLE I

The first example relates to graphitic bodies fabricated initially by either hot-working or extrusion and either containing a molybdenum carbide additive or containing no additives. The four types of bodies (described as samples 1, 2, 3, and 4,) are fabricated prior to hot-working in various ways described below.

Sample 1 is a graphitic body initially fabricated by hot-pressing and containing no additive. About 20 weight percent of coal tar pitch is mixed with graphite or carbon filler between 5 microns and 100 microns in particle size. Sufficient trichloroethylene is mixed with the pitch to ensure good spreading of the coal tar pitch over the filler particles. After evaporating the trichloroethylene, a charge of this mixture is hot-pressed at about 800° C. for about one hour to form a cylinder approximately one inch in diameter and two inches in length. After machining the ends flat and parallel, this specimen is ready to be hot-worked.

As shown in the drawing, the hot-pressed graphite cylinder 11 is placed in a resistance furnace 13 between two water-cooled rams, 20, with graphite ram heads, 15. One of the rams is hydraulically actuated. Control means 16 are provided for regulating the temperature of the furnace which is capable of temperatures up to about 3200° C. Gas circulation means 17 are also provided for establishing an inert gas atmosphere within the furnace. The graphite cylinder is heated to the hot-working temperature of 2800° C. over a period of about 90 minutes to allow for further carbonization and degassing. A compressive stress of about 7500 p.s.i. is applied to the opposite end faces of the rod 11, leaving the lateral surface of the cylinder free to expand. The total stress is applied within a period of about 4 minutes and is maintained for a period of about 50 minutes, resulting in an induced true strain of 53 percent. The hot-working load is then removed, and the sample is allowed to cool in the furnace.

Sample 2 is a graphitic body initially fabricated by extrusion and containing no additive. About 25 weight percent coal tar pitch is mixed with graphite or carbon filler in the same manner as for sample 1. Approximately 2 weight percent cellulose and 2 weight percent stearic acid are added to improve the extrusion characteristics. A charge of this mixture is then extruded at about 110° C. to form a rod one inch in diameter. After baking this rod under restraint to 900° C., the rod is cut into cylinders two inches long which comprise the samples to be hot-worked. The extruded sample is hot-worked at about 2800° C. under a compressive stress of about 4000 p.s.i. for a period of about 40 minutes, resulting in an induced true strain of about 45 percent.

Sample 3 is a graphite-carbide body initially fabricated by hot-pressing and containing molybdenum carbide. The body is fabricated in the same manner as sample 1 except that molybdenum carbide powder, in an amount shown in Table I, less than 65 microns in particle size, is blended into the charge for hot-pressing. The body is hot-worked at about 2700° C. under a maximum compressive stress of 7500 p.s.i. for a period of about 150 minutes, resulting in an induced true strain of about 56 percent. Beads of liquid molybdenum carbide saturated with graphite are formed on the surface of the body during hot-working and are subsequently removed by machining before testing.

Sample 4 is a graphite-carbide body initially fabricated by extrusion and containing molybdenum carbide. About 33 weight percent coal tar pitch is mixed with graphite or carbon filler in the same manner as for sample 1. Molybdenum metal powder, in an amount shown in Table I, less than 50 microns in particle size, is blended into the charge for extrusion. A one-inch diameter rod is extruded at about 210° C. After baking this rod under restraint to 900° C. and sintering to 1750° C., the rod is cut into cylinders two inches long, which comprise the bodies to be hot-worked. The extruded sample is hot-worked at about 2700° C., under an initial compressive stress of about 2500 p.s.i. and a final maximum stress of about 4000 p.s.i., for a period of about 20 minutes, resulting in an induced true strain of about 40 percent. Beads of liquid molybdenum carbide saturated with graphite are formed on the surface of the body during hot-working and are subsequently removed by machining before testing.

After hot-working, the samples are tested for metal content, density, porosity, helium permeability, compressive strength, modulus of rupture, coefficient of thermal expansion, and thermal diffusivity. The latter five properties are directional in nature and depend on the preferred orientation induced in the sample; these measurements are therefore made in directions parallel and perpendicular to the direction of load application in hot-working. The results are reported in Table I along with similar measurements on the same starting materials which have been annealed at temperatures equivalent to those used in hot-working.

The directional properties indicate the alterations in preferred orientation and, hence, the degree of controlled orientation effected by the hot-working process.

EXAMPLE II

The second example relates to graphitic bodies fabricated initially by hot-pressing and containing a zirconium carbide additive. The samples are fabricated by methods generally similar to those explained in Example I, and the results of test measurement are given in Table II.

Sample 5 is a graphitic body containing no additive and fabricated with about 10 weight percent coal tar pitch.

Sample 6 is a graphite body fabricated with about 10 weight percent coal tar pitch, based on the matrix phase, and containing about 50 weight percent zirconium carbide, based on the total weight of the body prior to hot-working, in the form of zirconium carbide particles between 125 microns and 180 microns in particle size; this body is hot-worked below the ZrC-C eutectic temperature so that the carbide phase is in the solid state during the hot-working process.

TABLE I

|  | Sample 1 | | Sample 2 | | Sample 3 | | Sample 4 | |
| --- | --- | --- | --- | --- | --- | --- | --- | --- |
|  | Annealed | Hot-Worked | Annealed | Hot-Worked | Annealed | Hot-Worked | Annealed | Hot-Worked |
| Nominal initial metal content (weight percent) | N.A. | N.A. | N.A. | N.A. | 37.8 | 37.8 | 35.6 | 35.6 |
| Metal content after annealing or hot-working, by analysis (weight percent) | N.A. | N.A. | N.A. | N.A. | 34.3 | 21.0 | 34.2 | 26.6 |
| Temperature of annealing or hot-working (° C.) | 2,600 | 2,800 | 2,800 | 2,800 | 2,700 | 2,700 | 2,700 | 2,700 |
| True strain in hot-working (percent) | 0 | 53 | 0 | 45 | 0 | 56 | 0 | 40 |
| Density (gm./cm.$^3$) | 1.84 | 2.04 | 1.56 | 1.80 | 2.58 | 2.67 | 2.32 | 2.66 |
| Porosity, pores greater than 0.1 micron, by mercury porosimetry (percent) | 10.2 | 1.8 | 27.4 | 12.5 | 7.4 | 0.9 | N.M. | N.M. |
| Helium permeability (cm.$^2$/sec.): | | | | | | | | |
| Parallel | $1.8 \times 10^{-3}$ | $1.5 \times 10^{-4}$ | $2.1 \times 10^{-1}$ | $9.2 \times 10^{-3}$ | $4.8 \times 10^{-4}$ | *$<10^{-6}$ | N.M. | N.M. |
| Perpendicular | $3.0 \times 10^{-3}$ | $4.7 \times 10^{-4}$ | $1.2 \times 10^{-1}$ | $1.4 \times 10^{-2}$ | $1.4 \times 10^{-4}$ | *$<10^{-6}$ | N.M. | N.M. |
| Compressive strength (p.s.i.): | | | | | | | | |
| Parallel | 9,100 | 9,400 | 4,200 | 3,500 | 10,300 | 38,300 | 6,100 | 18,300 |
| Perpendicular | 7,700 | 5,300 | 3,600 | 2,900 | 8,800 | 12,500 | 6,400 | 13,300 |
| Modulus of rupture (p.s.i.): | | | | | | | | |
| Parallel | 2,800 | N.M. | N.M. | N.M. | 6,400 | 5,300 | 5,800 | 6,500 |
| Perpendicular | 4,700 | N.M. | N.M. | N.M. | 8,200 | 19,400 | 3,700 | 11,500 |
| Coefficient of thermal expansion at 400° C. (° C.$^{-1}$): | | | | | | | | |
| Parallel | $6.1 \times 10^{-6}$ | N.M. | $1.0 \times 10^{-6}$ | $4.9 \times 10^{-6}$ | $4.9 \times 10^{-6}$ | $11.3 \times 10^{-6}$ | $3.8 \times 10^{-6}$ | $6.8 \times 10^{-6}$ |
| Perpendicular | $2.0 \times 10^{-6}$ | N.M. | $5.0 \times 10^{-6}$ | $3.6 \times 10^{-6}$ | $3.5 \times 10^{-6}$ | $1.9 \times 10^{-6}$ | $4.7 \times 10^{-6}$ | $4.0 \times 10^{-6}$ |
| Thermal diffusivity (cm.$^2$/sec.): | | | | | | | | |
| Parallel | 0.5 | 0.2 | N.M. | N.M. | 0.9 | 0.5 | 1.7 | 1.2 |
| Perpendicular | 1.0 | 1.3 | N.M. | N.M. | 1.5 | 2.7 | 1.1 | 2.2 |

N.A.—Not applicable. N.M.—Not measured.
*Helium permeability below the limit of detection of test apparatus.

TABLE II

|  | Sample 5 | | Sample 6 | | Sample 7 | | Sample 8 | |
| --- | --- | --- | --- | --- | --- | --- | --- | --- |
|  | Annealed | Hot-Worked | Annealed | Hot-Worked | Annealed | Hot-Worked | Annealed | Hot-Worked |
| Nominal initial metal content (weight percent) | N.A. | N.A. | 44.1 | 44.1 | 28.9 | 28.9 | 28.8 | 28.8 |
| Metal content after annealing or hot-working (weight percent) | N.A. | N.A. | N.M. | N.M. | N.M. | N.M. | 24.7 | 13.4 |
| Temperature of annealing or hot-working (° C.) | 2,800 | 2,800 | 2,650 | 2,600 | 2,950 | 2,950 | 2,950 | 2,950 |
| True strain in hot-working (percent) | 0 | 35 | 0 | 35 | 0 | 45 | 0 | 39 |
| Density (gm./cm.$^3$) | 1.74 | 1.91 | 2.56 | 2.65 | 2.33 | 2.28 | 2.23 | 2.31 |
| Porosity, pores greater than 0.1 micron, by mercury porosimetry (percent) | 15.0 | 8.1 | 14.8 | 10.7 | 11.8 | 2.0 | 12.4 | 0.8 |
| Helium permeability (cm.$^2$/sec.): | | | | | | | | |
| Parallel | $5.0 \times 10^{-3}$ | $6.6 \times 10^{-4}$ | $3.6 \times 10^{-2}$ | $4.1 \times 10^{-2}$ | $3.6 \times 10^{-3}$ | $1.1 \times 10^{-5}$ | $3.5 \times 10^{-3}$ | *$<10^{-6}$ |
| Perpendicular | $6.4 \times 10^{-3}$ | $2.4 \times 10^{-3}$ | $5.9 \times 10^{-2}$ | $6.8 \times 10^{-2}$ | $8.1 \times 10^{-3}$ | $3.3 \times 10^{-3}$ | $5.5 \times 10^{-3}$ | *$<10^{-6}$ |
| Compressive strength (p.s.i.): | | | | | | | | |
| Parallel | 5,900 | 5,900 | 5,300 | 4,000 | 8,000 | 13,200 | 8,200 | 21,100 |
| Perpendicular | 5,200 | 3,800 | 4,600 | 3,100 | 6,900 | 8,400 | 7,100 | 9,500 |
| Modulus of rupture (p.s.i.): | | | | | | | | |
| Parallel | N.M. | N.M. | N.M. | N.M. | N.M. | N.M. | 2,900 | 3,200 |
| Perpendicular | | | | | | | 4,000 | 14,000 |
| Coefficient of thermal expansion at 400° C. (° C.$^{-1}$): | | | | | | | | |
| Parallel | $7.0 \times 10^{-6}$ | $14.8 \times 10^{-6}$ | $6.6 \times 10^{-6}$ | $10.9 \times 10^{-6}$ | N.M. | N.M. | N.M. | N.M. |
| Perpendicular | $3.7 \times 10^{-6}$ | $1.8 \times 10^{-6}$ | $3.8 \times 10^{-6}$ | $4.0 \times 10^{-6}$ | | | | |
| Thermal diffusivity (cm.$^2$/sec.): | | | | | | | | |
| Parallel | N.M. | N.M. | N.M. | N.M. | N.M. | N.M. | 0.5 | 0.5 |
| Perpendicular | | | | | | | 1.5 | 3.0 |

N.A.—Not applicable. N.M.—Not measurable.
*Helium permeability below limit of detection of test apparatus.

Sample 7 is a graphitic body fabricated with about 20 weight percent coal tar pitch, based on the graphite matrix and containing about 33 weight percent zirconium carbide, based on the total weight of the body, prior to hot-working, in the form of coarse zirconium carbide particles, between about 125 and about 180 microns particle size; this body is hot-worked above the ZrC-C eutectic temperature so that the carbide phase is in the liquid state during the hot-working process.

Sample 8 is a graphitic body fabricated with about 20 weight percent coal tar pitch, based on the graphite matrix and containing about 33 weight percent zirconium carbide, based on the total weight of the body prior to hot-working, in the form of fine zirconium carbide particles, below about 40 microns in particle size; this body is hot-worked above the ZrC-C eutectic temperature so that the carbide phase is in the liquid state during the hot-working process.

Table II includes data for reference specimens which have been annealed at hot-working temperatures but without deformation.

The results as specified in Tables I and II above clearly indicate that compressive hot-working of refractory bodies containing a liquable dispersant, at temperatures above the melting point of said dispersant, results in a decrease in porosity over bodies that contain no liquid forming dispersant and/or are not hot-worked. Moreover, improved results are obtained relative to a body which is hot-worked at a temperature below the melting point of the dispersant. Tables I and II further indicate that the anisotropy is altered. The products produced by the above-described compressive hot-working technique where the lateral surfaces of the body are free and thus permit excess liquable dispersant to be removed, are considered substantially superior to the products which result from processes which use hot-pressing in an enclosed die. These products possess superior properties of strength, thermal diffusivity, and impermeability.

Samples Nos. 3, 4, and 8 in Examples I and II are considered to be refractory products of improved characteristics which are well-suited for use in a wide variety of applications where high density, low gas permeability, good thermal conductivity, good strength, and controlled thermal expansion are desirable.

Various of the features of the present invention are set forth in the appended claims.

What is claimed is:

1. A method for treating a body formed of a refractory material matrix which includes a liquable dispersant, which method comprises heating the body to a temperature sufficient to maintain dispersant in a liquid state while applying a compressive stress to said body for a predetermined time while said dispersant is molten.

2. A method for treating a body formed of a refractory material matrix which includes a liquable dispersant, which method comprises heating the body to a temperature sufficient to maintain dispersant in a liquid state while applying a compressive stress for a time sufficient to induce a permanent strain without causing fracture of said body, while said dispersant is molten.

3. A method for treating a body formed of a refractory material matrix which includes a liquable dispersant, which method comprises heating the body to a temperature sufficient to maintain dispersant in a liquid state while applying a compressive stress for a time sufficient to induce a permanent strain of from about 15 percent to 65 percent in said body, without causing fracture of said body, while said dispersant is molten.

4. A method for making refractory products which method comprises mixing particulate refractory material with particulate liquable dispersant, sufficient of the dispersant being present to enhance plastic flow of said refractory material, forming a structural body from said mixture with the dispersant distributed throughout a structural matrix of said refractory material, heating said body to a temperature sufficient to maintain dispersant in a liquid state while applying a compressive stress to said body in one direction sufficient to induce a permanent strain in said body while leaving said body free to expand in a direction generally perpendicular to said one direction.

5. A method for making refractory products which method comprises mixing particulate carbon material with a particulate liquable dispersant selected from the group consisting of zirconium carbide, molybdenum carbide, uranium carbide, aluminum carbide, and the above four metals and compounds thereof which form a carbide on thermal treatment, sufficient of said dispersant being present to enhance plastic flow of said carbon material at elevated temperatures and pressures, forming a structural body from said mixture with the dispersant distributed throughout a structural matrix of said carbon material, heating said body to a temperature sufficient to maintain dispersant in a liquid state while applying a compressive stress to said body in one direction sufficient to induce a permanent strain in said body while leaving said body free to expand in a direction generally perpendicular to said one direction.

6. A method for making refractory products which method comprises mixing particulate carbon material having a particle size of from about 5 microns to 100 microns with about 10 to 50 weight percent, based on the total weight of the body prior to hot-working, of a particulate zirconium carbide having a particle size of less than about 60 microns, forming a structural body from said mixture with the zirconium carbide distributed throughout a structural matrix of said carbon material, heating said body to a temperature of from about 2850° C. to 3200° C., and hot-working by applying a compressive stress of from about 2000 p.s.i. to 10,000 p.s.i. to said body in one direction for a time sufficient to induce a permanent strain in said body of from about 15 percent to 65 percent while leaving said body free to expand in a direction generally perpendicular to said one direction.

7. A method for making refractory products which method comprises mixing particulate carbon material having a particle size of from about 5 microns to 100 microns with about 10 to about 50 weight percent, based on the total weight of the body prior to hot-working, of particulate molybdenum carbide having a particle size of less than about 60 microns, forming a structural body from said mixture with the molybdenum carbide distributed throughout a structural matrix of said carbon material, heating said body to a temperature of from about 2600° C. to 3200° C., and hot-working by applying a compressive stress of from about 2000 p.s.i. to 10,000 p.s.i. to said body in one direction for a time sufficient to induce a permanent strain in said body of from about 15 percent to 65 percent while leaving said body free to expand in a direction generally perpendicular to said one direction.

References Cited

UNITED STATES PATENTS

| | | | |
|---|---|---|---|
| 2,215,214 | 9/1940 | Galey | 264—332 X |
| 2,386,604 | 10/1945 | Goetzel | 264—56 X |
| 3,001,238 | 9/1961 | Goeddel et al. | 264—111 X |

ROBERT F. WHITE, *Primary Examiner.*

J. A. FINLAYSON, *Assistant Examiner.*